Patented Aug. 6, 1946

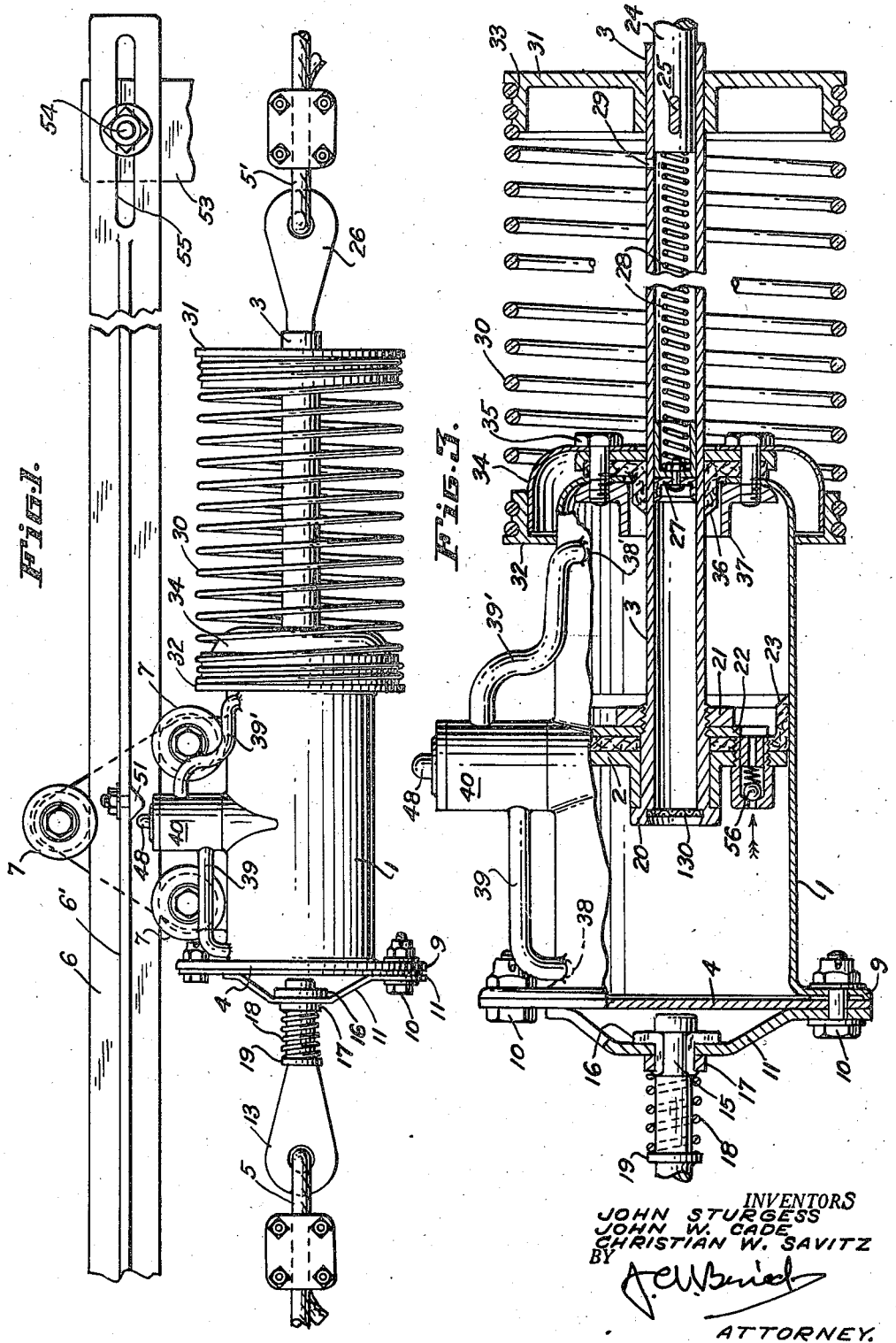

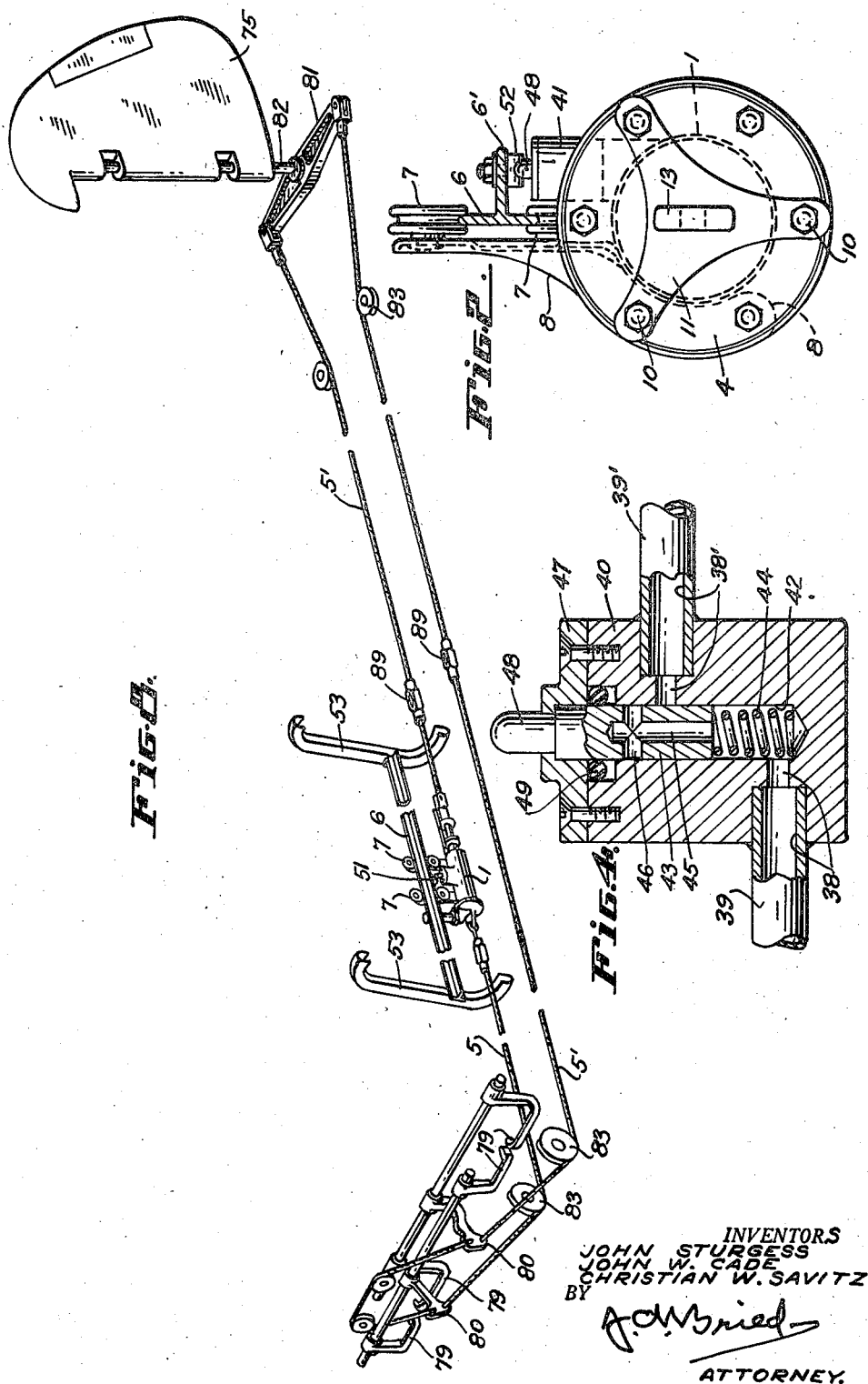

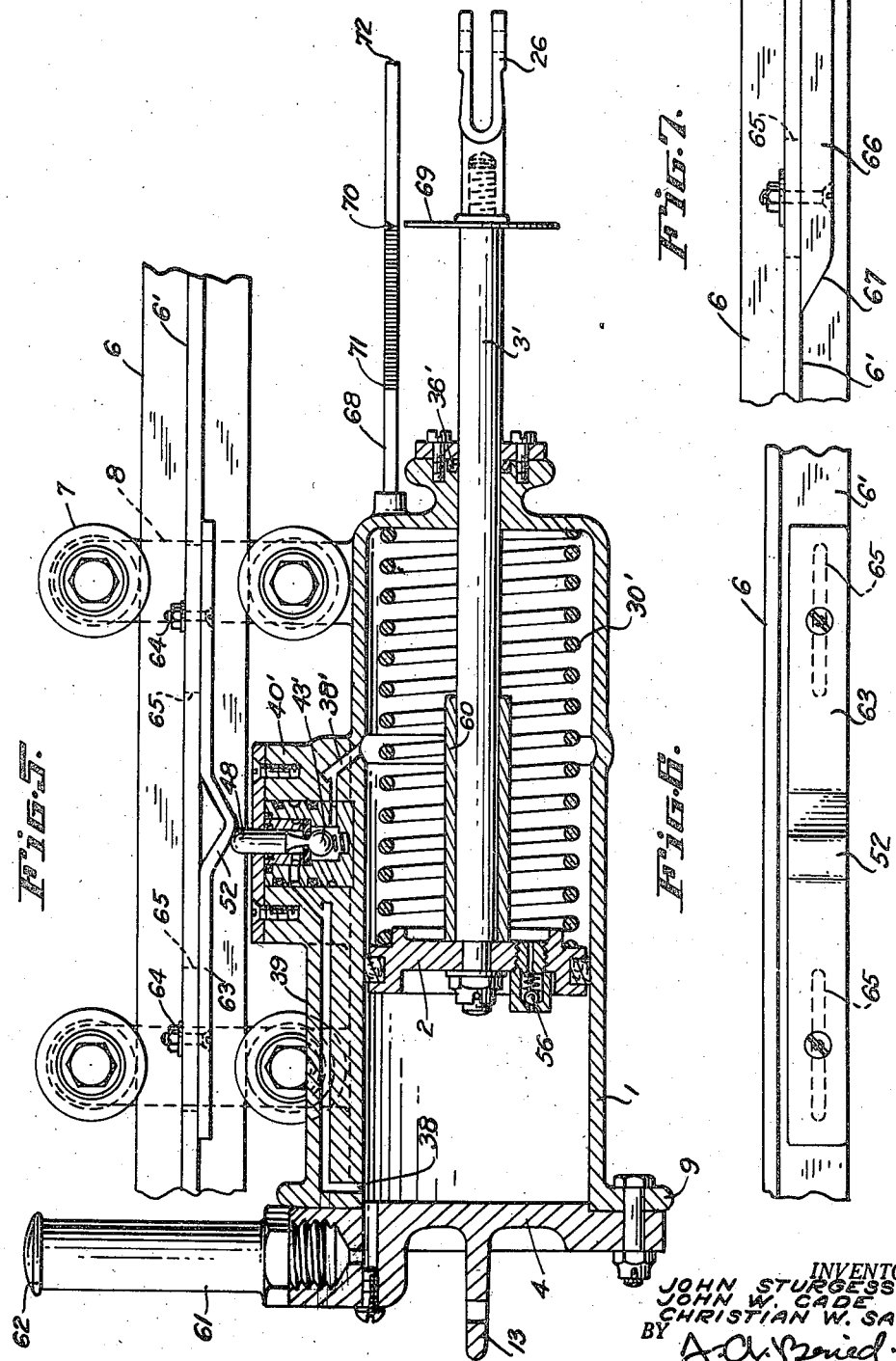

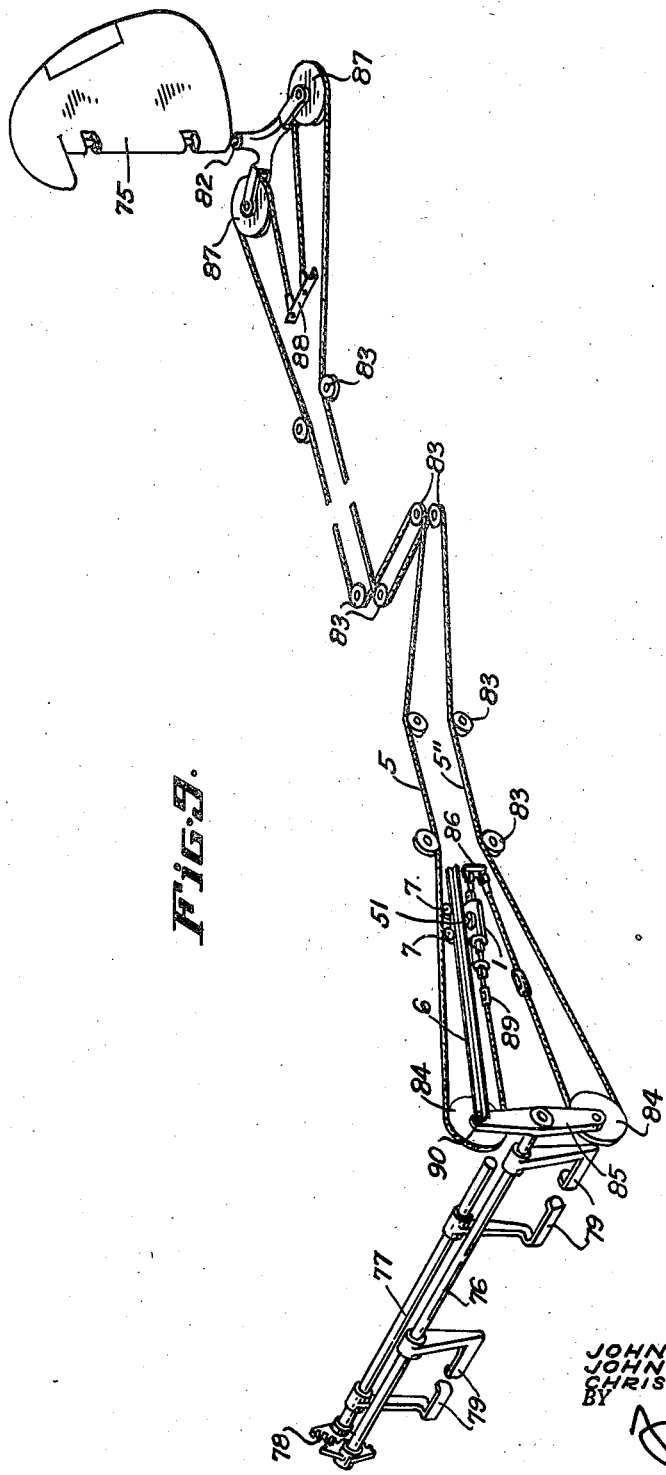

2,405,377

UNITED STATES PATENT OFFICE 2,405,377

CABLE TENSION REGULATOR

John Sturgess and John W. Cade, La Canada, and Christian W. Savitz, Norwalk, Calif., assignors to Sturgess, Inc., Glendale, Calif., a corporation of California Application August 2, 1943, Serial No. 497,028

16 Claims. (Cl. 74—501)

1

This invention relates to devices for automatically regulating or maintaining the desired tension in a work cable, rope, or wire, or a pair of such cables or wires which are required to be free from slack at all times or kept under a minimum operating tension, yet subject to greatly increased tension when the work load is applied, as in the operation of remote controls, signal, arms, etc.

The principal object of the present invention is to provide an improved cable tension controlling device particularly adapted for use with the rudder, elevators, ailerons, and other movable parts of aircraft which are situated a considerable distance from the point where the controlling force is applied to the cables.

A feature of importance is that the improved construction adapts the tension regulator to be used in any type of cable control system, and for any kind of movable control surface or device.

Particular advantages and features of the improved construction will appear in the following description and accompanying drawings.

In the drawings—

Fig. 1 is a side elevation of our improved cable tension regulator as applied to the ends of a work cable at an intermediate point in the run of the cable.

Fig. 2 is an end elevation of the device of Fig. 1.

Fig. 3 is a view similar to that of Fig. 1 but showing the device in longitudinal cross section.

Fig. 4 is a sectional detail of the by-pass valve of the device.

Fig. 5 is a sectional view similar to that of Fig. 3 but showing a modification of the construction.

Fig. 6 is a bottom plan view of the track and cam of Fig. 5.

Fig. 7 is a side elevation of a modified form of cam.

Fig. 8 is a perspective sketch showing a typical aircraft rudder control system with our tension regulator applied at an intermediate point in the run of one of the control cables.

Fig. 9 is a perspective sketch of an aircraft rudder control showing one way of using our tension regulator in the so-called dead end cable system.

Before describing the drawings in detail it may be stated that broadly the regulator comprises a spring compensator adapted to be interposed as a link in an operating cable desired to be maintained taut at all times with a predetermined tension, but which cable is subject at

2 intervals to a greatly increased tension when a working pull is applied to it to accomplish the work to be done, and after the working pull is removed the cable is slacked off below its predetermined tension.

The function of the regulator is to take up (through its spring) any slack in the cable to maintain the cable taut at the said predetermined tension when not being subject to the extra working pull, and to lock out the spring during such time as the working pull is applied, so that the working pull will be transmitted direct without passing through the spring.

The locking out of the spring during the working pull is accomplished through bodily movement of the regulator with respect to an adjacent relatively fixed tripping device past which the regulator moves, and the unlocking of the spring similarly taking effect upon reverse bodily movement of the regulator relative to the tripping device.

In its preferred form the regulator comprises a hydraulic cylinder with a slidable piston inside having a piston rod extended from one end of the cylinder, and with a spring tending to force the piston toward the opposite end of the cylinder.

The rope or cable to be tensioned is cut and the regulator interposed between the ends by securing them respectively to the cylinder and to the piston rod with the spring tensioned to yield the minimum cable tension desired to be maintained. The cylinder is filled with a hydraulic liquid, preferably oil, and a valved by-pass passage extending from opposite ends of the cylinder around the piston, provides when its valve is closed for stopping the piston from movement within the cylinder under a working pull, thus effectively locking out the spring and transmitting the pull direct, whereas upon opening the by-pass valve the liquid is free to surge back and forth from either end of the cylinder so that the spring tension is always maintained on the rope when not subjected to a working pull. The by-pass valve is arranged to be normally closed except when tripped to open position by a cam device or its equivalent which is relatively fixed with respect to the bodily movement of the regulator with the movement of the cable in which it is interposed.

In ordinary aircraft controls having two cables for forcibly pulling the rudder, elevator, etc., to either side from a central position there may be one of the regulators for each cable, and the valve trip set to open the by-pass only along the central position of the rudder or other control surface, while for signal or other purposes where a pivoted device is moved the entire distance either way respectively, each time either cable is pulled, the valve trip is set to open the by-pass only at the final end of the movement of the non-pulling cable.

Various novel and important features are incorporated in the above general structure as will appear later.

With respect to the design shown in Figs. 1 to 3, the cylinder is designated 1, the piston body 2, piston rod secured thereto 3, closed head of the cylinder 4, ends of cable between which the regulator is interposed are designated 5 and 5' respectively secured to the closed end of the cylinder and the outer end of the piston rod.

In use the regulator is rollably suspended on a fixed track 6 by means of grooved idlers 7 carried by a bracket 8 in turn secured to the cylinder, or rather to end bolting flange 9 of the cylinder to which the closing head 4 is secured as by bolts 10.

Bolts 10 also secure the arms of a spider 11 to the head 4 and flange 9 of the cylinder, and which spider revolvably supports a cable connecting draft rod 15 provided with a flattened apertured head 13. The rest of the rod is round and formed with a portion of reduced diameter embraced within the two halves of a split bushing collar 16 which rotatably fits within a central hole in the spider, and which split bushing is held in place by a solid locking ring 17 engaging over the neck of the split bushing and urged against the spider by a small compression spring 18 reacting at its outer end against a shoulder 19 formed on rod 12. This construction makes it easy to disconnect the draft rod 15 and its cable 5 from the cylinder by backing off the locking ring 17 against spring 18 and slipping out the halves of the split bushing 16.

The piston rod 3 is here shown hollow to function as an oil displacement and make-up reservoir, and it is formed with a head 20 at its inner end against which the piston body 2 of the piston bears and is clamped thereagainst by a nut 21 screwed on the rod against a washer 22 and also clamping a conventional cup-leather packing 23 in place.

Hollow piston rod 3 is closed at its outer end by a draft rod 24 which is keyed through the tube by a key 25, and the outer end of the rod is flattened as at 26 and apertured to receive the cable 5' like the end 13 of the opposite draft rod described. Within the hollow piston rod is a small floating suitably packed thimble-like piston 27 normally urged toward the cylinder 1 by a light wire compression spring 28 which is seated at its outer end against the inner end of draft rod 24. A small vent 29 in hollow rod 3 provides for air circulation at the outer side of piston 27, while at the inner end is a small disk screen 130 crimped in place.

While a coiled compression spring may be used within the cylinder to urge the piston one way for tensioning the cable, and as shown in the design of Fig. 5 to be later described, in Figs. 1 to 3 a relatively large diameter coiled tension spring 30 is used at the outer end of the cylinder as such a spring has advantages not found in a compression spring, particularly in operating over a greater range and not requiring support against inward collapse. This spring is initally very tightly wound so as to require considerable force to open or stretch it to hold the piston in about the center of the cylinder with a tension of about sixty pounds on the cable (depending on the size and service to which it is put).

The spring is mounted at opposite ends upon two flanged disks, 31 and 32 spirally grooved or "threaded" as indicated at 33 to tightly receive the ends of the closed coil of wire which is forcibly screwed upon it and preferably welded at the end of the wire to prevent unscrewing. Disk 31 is provided with a central hub to slidably fit over the outer end of the piston rod and also over the projecting ends of key 25. Disk 32 is revolvably carried over the end of the cylinder 1 as by a cup-shaped metal stamping 34 which is secured to the end of the cylinder as by cap screws 35 which also hold a cup-leather packing 36 for the piston rod in place and also hold an inner tubular collar 37 in position within the cylinder to provide a limit stop for the piston movement and protection for the cup-leather.

The cylinder is filled on both sides of the piston with a suitable hydraulic liquid able to stand low temperatures without freezing, as is also the displacement space within the hollow piston rod until its spring 28 is compressed about half way, the by-pass passage 38—38' is here indicated as extended in tubes 39, 39' through a shut-off or by-pass valve 40, and which passage opens at its ends to opposite ends of the cylinder.

The by-pass valve 40 is shown in section in Fig. 4 and wherein the by-pass passages connect respectively to the lower and upper portions of a vertically disposed plunger valve chamber 42 in which is slidably positioned a plunger valve 43 normally forced outward by a spring 44 to close off passage 38' as shown, but which when depressed open both passages 38 and 38' through the bore 45 and side ports 46 of the plunger. A cap 47 at the upper end of the valve body 40 fits over the reduced upper end 48 or stem of the valve which projects for operating the valve, while suitable packing, such as a rolling Thiokol ring 49 in a wide recess 50 below the cap insures against liquid leakage around the stem.

The track 6 upon which the regulator rolls is of a length great enough to support the regulator for the full distance the cable must move, as well as to allow for some longitudinal adjustment if required. The track is preferably of T form in cross section as shown in Fig. 2 and with the cross bar of the T extending vertically with the grooved rollers 7 engaging it from above and below so that the regulator cannot become detached.

Attached to the horizontally extending central leg 6' of the track is a valve tripping cam 51 bolted or otherwise secured thereto in a position to depress the stem 48 of by-pass valve 40 as the regulator is moved longitudinally along the track and hold the by-pass passage open as long as the regulator is in valve tripping position.

The exact position of tripping the valve may be determined by longitudinal adjustment of the track at its end supports 53 to which it may be adjustably secured as by bolts 54 passing through slots 55 formed adjacent the ends of the track after cutting away some of the central leg 6' of the track as indicated in Fig. 1 or in any other suitable manner.

In some installations the regulators are installed on a pair of cables as used for aircraft controls in a position to trip or open the by-pass valves when the control surfaces are in neutral or central position, whereas for the other kinds of service it may be desirable to hold the valves open on the slack cable at the extreme ends of the non-pulling movement or "stroke," while in still others the valve may be kept open for half of the stroke. Such variations of setting may be secured through the original setting or installing, or to a limited exent by shifting the tracks longitudinally and/or the position of the tripping cam 51, or by the use of special cams 52, 67 shown at Figs. 6 and 7 to be described.

Also, in some service requirements a one way light spring loaded check valve may be placed in the head of the piston as shown at 56 in Fig. 3 (and Fig. 5) wherein the passage is normally closed. This insures the freedom of the spring to exert its limit of pull at all times on the cable even tho the working pull should fall below it at times when the by-pass valve is closed.

In the modified form of the regulator shown in Fig. 5 the parts which operate the same as those in the preceding figures have been given the same numerals so as to avoid the necessity of redescribing them. The same features differing slightly from the preceding are in the use of a cast cylinder body 1 with a cast head 4 with the cable connection 13 cast integrally with it. Also cast channel 39 for the by-pass passage 38 and the use of two brackets 8 for two grooved rollers 7 each, embracing the track 6.

In this figure the spring 30' is an open coil compression spring instead of a tension spring and is placed within the cylinder 1 which is made longer for this purpose, while a tubular stop 60 surrounds the piston rod to limit the piston travel in compressing the spring.

The rod packing box is indicated at 36', and the oil displacement and make-up chamber instead of being within a hollow piston rod, is vertically positioned at 61 at one end of the regulator and provided with a screw filling cap 62.

In this showing a ball type by-pass valve 43' is used, and the body 40 is cast integral, and the stem 48 is tripped by the track cam as before, but the cam 52 is shown as formed by bending a flat strip of metal 63 in turn bolted as at 64 to the track through slots 65 cut in the track for longitudinal adjustment (see Fig. 6).

In Fig. 7 is shown in side elevation a form of elongated cam 66 to hold the by-pass valve open during any desired part of the travel of the regulator, and close it when the valve stem passes the slanted end 67.

As the position of the piston of this form should be about one third from the closed end of the cylinder when the pull on the cables is under spring control only (with by-pass open) and at mean temperature of the locality in which the installation is being used, a suitable gage is provided to facilitate accomplishing this. This gage may take the form of a rod 68 projecting from the body of the cylinder parallel to the piston rod and adjacent which rod a thin disk 69 secured to the piston rod travels. The rod 68 being marked at 70 for the proper position for the piston, and also colored or marked at 71 and projecting to 72, to show opposite extremes of travel.

From the above description and explanation of the functioning of the various parts, the operation of the tension regulator should be clear, however, as there are various ways of installing the regulator, depending on the service to which the cable or cables are put, as well as the particular arrangement and relation of the operating to the operated parts, Figs. 8 and 9 have been included to indicate two modes of installing the regulator in the rudder control system of an airplane.

In the figures a rudder is indicated at 75, tho this is for illustration only as the pivoted control surface or other device to be operated may be anything which it is desired to swing by cable, rope, or wire pull from a remote point, such as from the pilots position on the plane. At 76 and 77 respectively is the pedal operated control shafts geared or linked together as at 78 for reverse rotation and provided with two pairs of pedals 79 with the control cables 5, 5" either connected at their forward ends directly to cranks 80 and at their rearward ends to the rocker arm 81 secured to the rudder shaft 82, and the cables suitably guided by idler pulleys 83 as may be required, all as shown in Fig. 8 and which is a conventional system, or as shown in Fig. 9 the cables 5, 5" from the rudder may pass over pulleys 84 carried on a crank arm 85 on one of the control shafts and then extend to a fixed anchor plate 86. Similarly at the rudder the cables pass over pulleys 87 and return to a fixed anchor plate 88 secured to a convenient part of the plane fuselage. Besides, any number of guide pulleys or idlers 83 used to lead the cables around obstacles to their desired destinations. This latter arrangement is known as the "dead end control system."

In the conventional system as shown in Fig. 8 our regulator 1 is shown interposed in one cable only, and rollably supported on its track 6 as explained previously in detail, tho as stated, preferably there is one in each of the cables. Since any bodily movement of the regulator from central position of the rudder, trips the by-pass valve 49, it is desirable that the body of the regulator or cylinder 1 should only move as the control pedals are moved and not from relative elongation or contraction of the cables with respect to the airplane structure lying between the pilot and the rudder, it is therefore preferable that the regulator be mounted as near the pilot end of the system as practicable and that the short piece of cable from the control crank be secured to the cylinder portion of the regulator. Also suitable turnbuckles are provided in the cables as at 89 to provide for proper setting of the regulator piston at mean temperature.

In the "dead end" type of installation, since the cylinder 1 is anchored and cannot move back and forth to trip the by-pass valve, the track with its tripping cam is moved instead. This is accomplished by pivotally connecting one end of a short piece of track 6 or other rod to the operating crank 85 of the control shaft as at 90 and extending the free end of the track over the cylinder 1 embraced by its grooved rollers 7 and with the tripping cam 51 carried by the track, all so that as the cable is moved back and forth from central rudder position in operating the control shaft it will trip the by-pass valve as previously described.

From the above description of the operation of our cable tension regulating apparatus it is evident that while we show it interposed in the cables of a manually controlled system, it will operate just as well in any automatic control system in maintaining a predetermined minimum tension on the control cables.

Having thus described our invention and its mode of operation, it will be obvious to those skilled in the art that various changes in detail of construction may be made within the spirit of the invention as sought to be covered in our ap- pended claims, and our use of the words "cable" or "cables" herein is intended to cover the equivalent for some installations where ropes, wires, chains, or rods, under tension, are commonly employed to operate from a distance a pivotally movable member back and forth.

We claim:

1. In a control cable tension regulator of the type adapted to be interposed in a run of control cable with the ends of the cable secured thereto so as to form a link in said run and said regulator including tensioning means for maintaining a tension on said cable: the improvement which comprises locking means for locking out said tensioning means whereby the cable pull is rendered direct through said regulator and means extraneous to and movable with respect to said regulator adapted to lock and unlock said locking means as the regulator moves bodily with the control cable.

2. In a control cable tension regulator of the type adapted to be interposed in a run of control cable with the ends of the cable secured thereto so as to form a link in said run and said regulator including tensioning means for maintaining a tension on said cable: the improvement which comprises locking means for locking out said tensioning means whereby the cable pull is rendered direct through said regulator, an elongated member along which said regulator moves relatively as the control cable is operated, and means carried by said member for operating said locking means as the regulator moves relatively.

3. In a control cable tension regulator of the type adapted to be interposed in a run of control cable with the ends of the cable secured thereto so as to form a link in said run and said regulator including tensioning means for maintaining a tension on said cable: the improvement which comprises locking means for locking out said tensioning means whereby the cable pull is rendered direct through said regulator, including a member along which said regulator moves relatively as the control cable is operated, and means carried by said member for operating said locking means as the regulator moves relatively, a movable control element for pulling said cable, said member linked for movement by said control element to move said member relative to said regulator as the cable is pulled.

4. In a control cable tension regulator of the type adapted to be interposed in a run of control cable with the ends of the cable secured thereto so as to form a link in said run movable longitudinally back and forth therewith as the cable is moved longitudinally and said regulator including spring-means for maintaining a tension on said cable; the improvement which comprises locking means for locking out said spring-means whereby the cable pull is rendered direct through said regulator and a relatively fixed track along which said regulator moves as the control cable is operated, and tripping means carried by said track arranged to operate said locking means as the regulator moves relatively therealong.

5. In a control cable tension regulator of the type adapted to be interposed in a run of control cable with the ends of the cable secured thereto so as to form a link in said run movable longitudinally back and forth therewith as the cable is moved longitudinally and said regulator including spring-means for maintaining a tension on said cable; the improvement which comprises locking means for locking out said spring-means whereby the cable pull is rendered direct through said regulator and a relatively fixed track along which said regulator moves as the control cable is operated, and tripping means carried by said track arranged to operate said locking means as the regulator moves relatively therealong, said tripping means being set to unlock said spring-means at a minor portion of the travel of said regulator along said track and to lock it at the major portion of its travel.

6. In a control cable tension regulator of the type adapted to be interposed in a run of control cable with the ends of the cable secured thereto so as to form a link in said run movable longitudinally back and forth therewith as the cable is moved longitudinally and said regulator including spring-means for maintaining a tension on said cable; the improvement which comprises locking means for locking out said spring-means whereby the cable pull is rendered direct through said regulator and a relatively fixed track along which said regulator moves as the control cable is operated, and tripping means carried by said track arranged to operate said locking means as the regulator moves relatively therealong, said tripping means being set to unlock said spring-means at the central portion of the travel of said cable and to lock it out for the remainder of its travel.

7. In a control cable tension regulator as set out in claim 4, means for adjustably securing said tripping means relative to said regulator and along the path of travel thereof.

8. In a control cable tension regulator as set out in claim 4, said track being T shaped in cross section with the leg of the T carrying said tripping means, and rollers engaging the edges of the cross arm of the T rollably supporting the regulator thereon.

9. In a control cable tension regulator of the character described having a hydraulic cylinder with a piston slidable therein and piston rod extending therefrom and means for securing the ends of a cable respectively to the outer end of said piston rod and to the remote end of said cylinder and spring-means urging said piston toward one end of the cylinder and a liquid by-pass passage extending from the cylinder spaces at opposite sides of the piston: the improvement which comprises a valve on said passage, and a relatively fixed valve tripping device arranged adjacent said cylinder adapted to trip said valve as the cylinder is moved longitudinally upon operating the control cable.

10. In a control cable tension regulator of the character described having a hydraulic cylinder with a piston slidable therein and piston rod extending therefrom and means for securing the ends of a cable respectively to the outer end of said piston rod and to the remote end of said cylinder and spring-means urging said piston toward one end of the cylinder and a liquid by-pass passage extending from the cylinder spaces at opposite sides of the piston: the improvement which comprises a valve on said passage, and a relatively fixed valve tripping device arranged adjacent said cylinder adapted to trip said valve as the cylinder is moved longitudinally upon operating the control cable, a track supporting said cylinder for relative movement therealong, and said tripping device carried by said track.

11. In a control cable tension regulator of the character described having a hydraulic cylinder with a piston slidable therein and piston rod extending therefrom and means for securing the ends of a cable respectively to the outer end of said piston rod and to the remote end of said cylinder and spring-means urging said piston toward one end of the cylinder and a liquid bypass passage extending from the cylinder spaces at opposite sides of the piston: the improvement which comprises a valve on said passage, said piston rod being hollow with its inner end open to the cylinder space at one side of the piston only, and a piston slidably positioned within the bore of the hollow piston rod urged inwardly by a light spring to afford a liquid displacement and loss make-up chamber.

12. In a control cable tension regulator of the character described having a hydraulic cylinder with a piston slidable therein and piston rod extending therefrom and means for securing the ends of a cable respectively to the outer end of said piston rod and to the remote end of said cylinder and spring-means urging said piston toward one end of the cylinder and a liquid by-pass passage extending from the cylinder spaces at opposite sides of the piston: the improvement which comprises a valve on said passage, and a check valved passage extending directly through the piston to permit flow of liquid in opposite direction to movement of the piston by said spring-means.

13. In a structure as set out in claim 9, means supporting said cylinder substantially horizontally, and a liquid displacement and make-up reservoir extending upwardly from the rear end of said cylinder serving also as an air trap.

14. In a control cable tension regulator of the type adapted to be interposed in a run of control cable with the ends of the cable secured thereto so as to form a link in said run to move longitudinally back and forth with the cable as the cable is moved longitudinally and said regulator including spring-means for maintaining a tension on said cable: the improvement which comprises locking means for locking out said spring-means whereby the cable pull is rendered direct through said regulator and means for operating said locking means from a point extraneous to said regulator as the regulator moves longitudinally with the cable.

15. In a structure as set out in claim 9, said valve comprising a piston-type plunger slidably arranged to shut off or open the by-pass passage and normally held in close position by a spring and with the end of the plunger extending for operation by said tripping device.

16. In a structure as set out in claim 9, gage means carried by said piston rod, and cooperating gage means carried by said cylinder denoting the position of said piston in said cylinder.

JOHN STURGESS.
JOHN W. CADE.
CHRISTIAN W. SAVITZ.